United States Patent
Yen et al.

(10) Patent No.: US 6,772,028 B1
(45) Date of Patent: Aug. 3, 2004

(54) METHOD FOR PROCESSING ORDER CHANGES IN A MANUFACTURING SYSTEM

(75) Inventors: Kevin Yen, Hsin-Chu (TW); Ching-Yun Chang, Hsin-Chu (TW); David Yen, Hsin-Chu (TW); Eric Hu, Changhua (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/397,476

(22) Filed: Mar. 26, 2003

(51) Int. Cl.[7] .............................................. G06F 19/00
(52) U.S. Cl. ......................... 700/99; 700/106; 705/22; 705/29
(58) Field of Search .................. 700/99, 106, 107; 705/10, 22, 28, 29

(56) References Cited

U.S. PATENT DOCUMENTS 6,463,345 B1 * 10/2002 Peachey-Kountz et al. ... 700/99
2002/0072986 A1 * 6/2002 Aram ........................... 705/26
2002/0072988 A1 * 6/2002 Aram ........................... 705/26
2002/0198757 A1 * 12/2002 Hegde et al. ................... 705/8
2003/0074247 A1 * 4/2003 Dick et al. ...................... 705/9
2003/0102367 A1 * 6/2003 Monette et al. ............. 235/376
2003/0177050 A1 * 9/2003 Crampton et al. .............. 705/8

* cited by examiner

Primary Examiner—Leo Picard
Assistant Examiner—Douglas S. Lee
(74) Attorney, Agent, or Firm—Haynes and Boone, LLP

(57) ABSTRACT

A method for performing a synchronized order change in a manufacturing process is provided. An order is associated with an order number and a work in process (WIP) number, which identifies a physical lot corresponding to the order. The synchronized order change maintains a relationship between the order number and the WIP number while making the change. This avoids the need to scrap lots that are no longer associated with an order number and prevents holds from being placed on incorrect lots.

21 Claims, 4 Drawing Sheets

METHOD FOR PROCESSING ORDER CHANGES IN A MANUFACTURING SYSTEM

BACKGROUND

The present invention relates generally to managing work flow in a manufacturing system such as a semiconductor manufacturing system, and more particularly to a system and method for synchronizing an order change in the manufacturing system.

Manufacturing systems, such as semiconductor manufacturing systems, generally use multi-step processes that result in a finished product. The steps frequently occur in a fixed order. For example, such a process may begin when a customer places an order with a customer service or sales representative, who assigns an order number to the order. The order may also be assigned a work in process (WIP) number, which is used to identify a lot (e.g., a physical batch of goods) that corresponds to the order. The order number and WIP number are then matched after manufacturing is completed and the order is shipped to the customer associated with the order number.

Because of the complex and often automated nature of modern manufacturing systems, it may be difficult to alter or stop an order once the lot associated with the order has entered the manufacturing process. For example, if a customer changes an order for semiconductor devices, current practices frequently involves changing the old order with a new product name. However, the modification of the old order may result in losing track of the original related lot and so the original lot may be treated as an excess lot because the WIP device name no longer corresponds to a device name in the order. Furthermore, if there are multiple orders, a change in one of the orders may result in a hold being placed on an order. However, the incorrect order may be held, which delays the production of the incorrect order and may allow the order that should be changed to continue to completion. These scenarios are obviously not desirable from either a profit or inventory standpoint.

In the semiconductor manufacturing process, due to its nature of long time periods, multiple processing steps, multiple processing locations, any inconsistency in the labeling for the manufactured lots that happens at any time can cause severe consequences including unnecessary financial costs to the manufacturing company. In addition, administrators of the manufacturing process will have to spend much more time to resolve the inconsistency manually.

Therefore, certain improvements are desired for manufacturing processes. For example, it is desired to better adapt to changes to an order that are made once the order has entered a manufacturing process.

SUMMARY

In one embodiment, a method for synchronizing at least one order change request in a manufacturing system is provided, where the order is associated with an order number and a work in process (WIP) number identifying a physical manufacturing lot. The method comprises freezing a relationship between the order number and the WIP number upon receipt of the order change request and providing at least one order change option based on the order change request. A match code associated with the order change option is identified and the order number and the WIP number are updated using the match code, so that the WIP number is synchronized with the order number.

DETAILED DESCRIPTION

Figure 1:
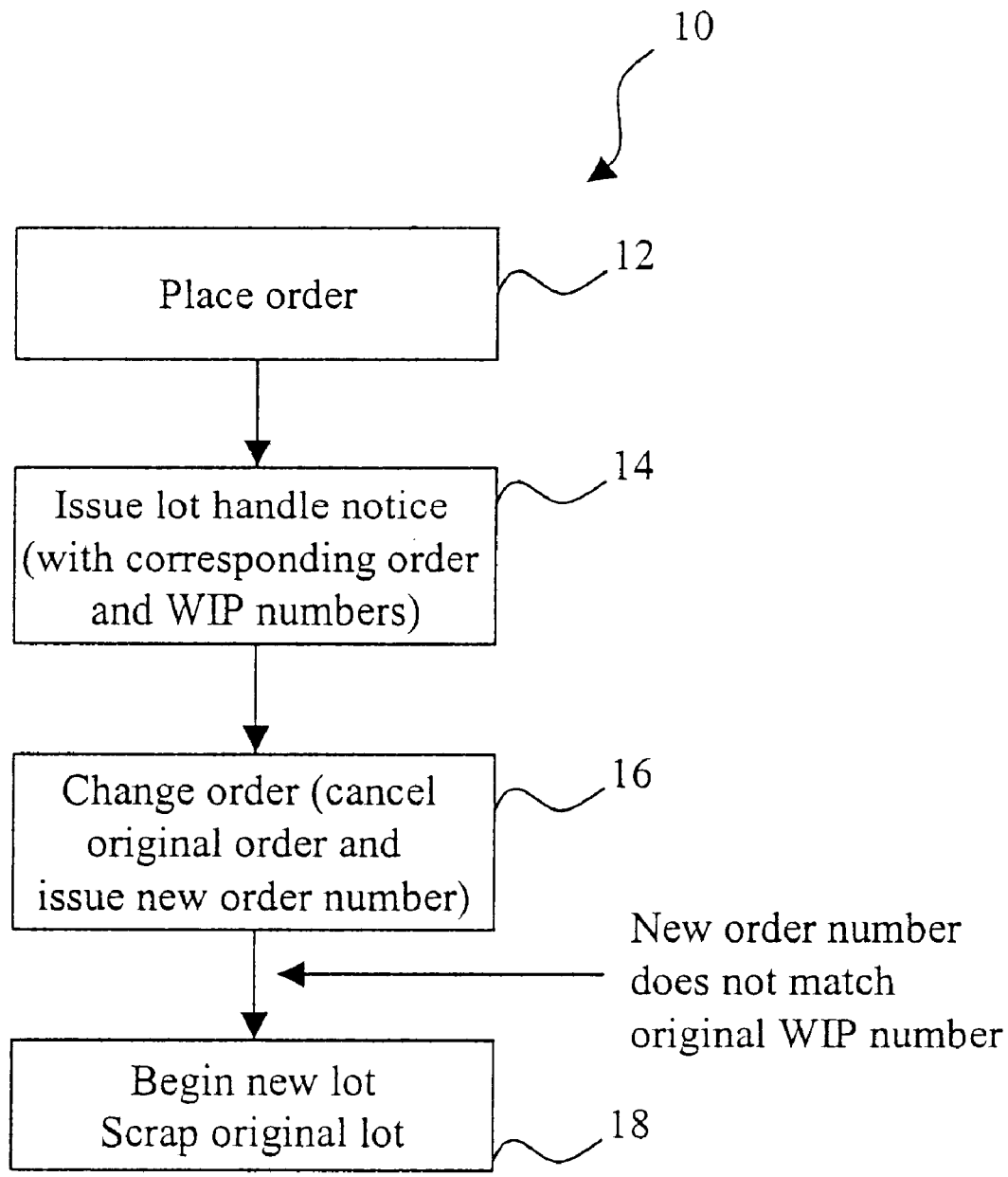
FIG. 1 is a flow chart illustrating an order transaction flow where a lot is scrapped after an order change occurs because the lot's WIP number no longer corresponds to a valid order number.

The present invention relates generally to synchronizing an order change in a manufacturing system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring now to FIG. 1, a method 10 illustrates an order transaction flow where a lot is scrapped after an order change occurs because the lot's work in process (WIP) number no longer corresponds to a valid order number. The method 10 begins in step 12 when a customer places an order. For purposes of illustration, the order is for semiconductor chips, but it is understood that the order may be in any area of manufacturing. The order is associated with an order number (e.g., 1234A) and a lot handle notice is issued in step 14. Associated with the lot handle notice is a WIP number (e.g., 1234A) that relates a physical lot with the order number. Assuming the manufacturing process is allowed to continue to completion, the order number and the WIP number would be matched to identify the customer to whom the lot belongs. However, if the order is changed before completion, problems may arise.

In step 16, the customer submits an order change after a hold/release decision on the lot has been made. In the present example, the order change is accomplished by submitting a new order (e.g., 1234B), which invalidates the original order number 1234A. However, there is still a lot associated with the WIP number 1234A. As there is no valid order associated with the WIP 1234A, the lot cannot be linked to an order and is scrapped. Because there is no lot with a WIP matching the new order number, a new lot with WIP 1234B is initiated in step 18 to fill the order. Accordingly, the method 10 results in wasted resources and may result in inventory imbalances.

Figure 2:
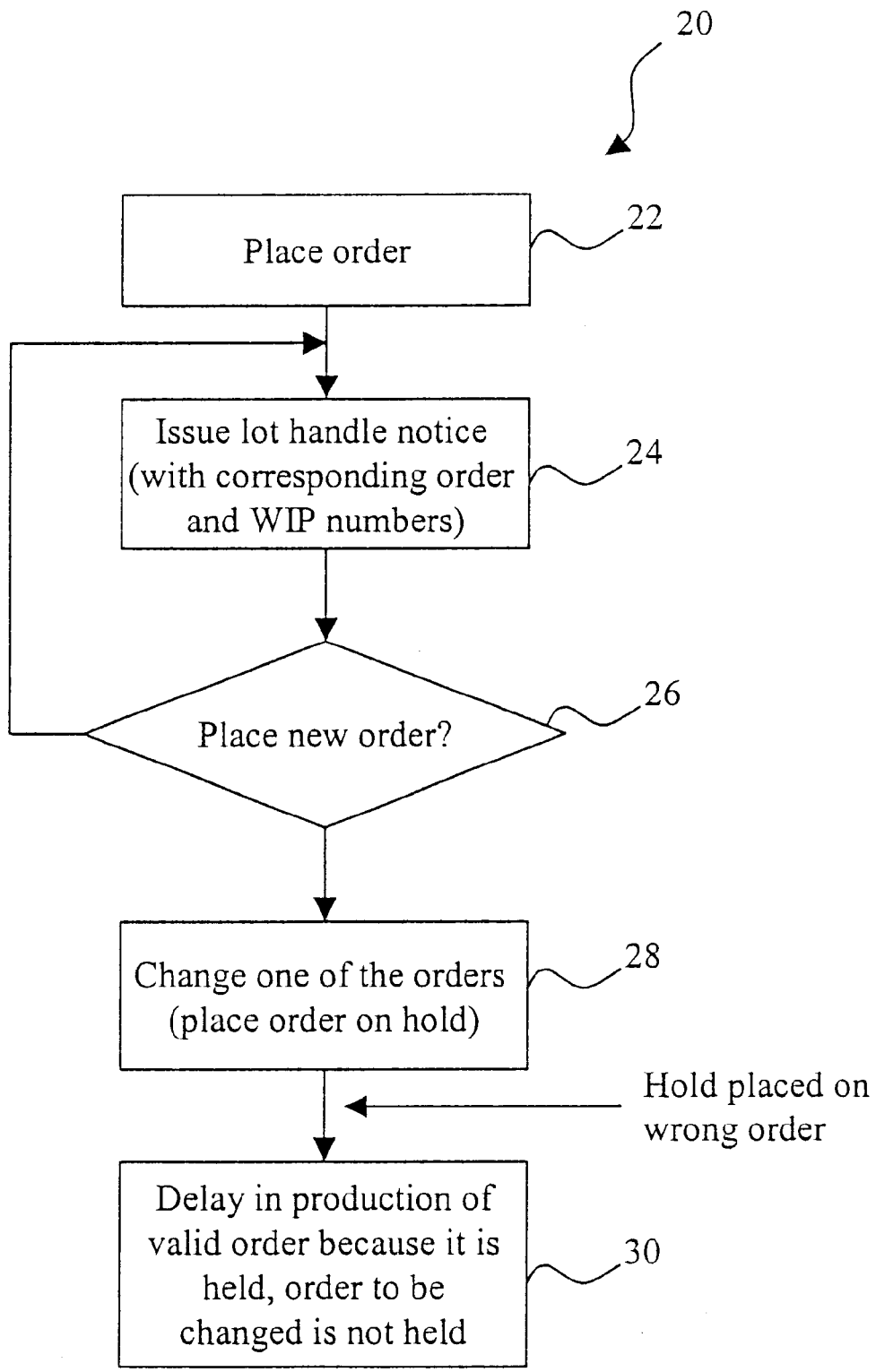
FIG. 2 is a flow chart illustrating an order transaction flow where a lot hold is placed against an incorrect lot.

Referring now to FIG. 2, a method 20 illustrates an order transaction flow where a lot is delayed because a hold is placed on an incorrect lot. The method 20 begins in step 22 when a customer places an order. As described in FIG. 1, the order is for semiconductor chips, but it is understood that the order may be in any area of manufacturing. The order is associated with an order number (e.g., 1234A) and a lot handle notice is issued in step 24. Associated with the lot handle notice is a WIP number that corresponds to the order number (e.g., 1234A). In step 26, other orders may be entered by returning to step 24, and issuing additional order and WIP numbers. It is understood that orders may be entered at any time, although this is not explicitly shown in FIG. 2. For purposes of illustration, a second order is entered and assigned the order and WIP numbers 1234B.

In step 28, an administrator/operator in the manufacturing process submits an order change for the lot 1234A. This change may occur, for example, after an initial hold/release decision on the lot has been made. In response to the order change, one of the lots is held (e.g., halted at its present position in the manufacturing process). However, because there are multiple orders in the system for the same customer, the hold is mistakenly placed on lot 1234B. This results in the situation of step 30, where the lot 1234B (which should not be changed) is delayed, while the lot 1234A (which should be changed) is allowed to continue through the manufacturing process.

Figure 3:
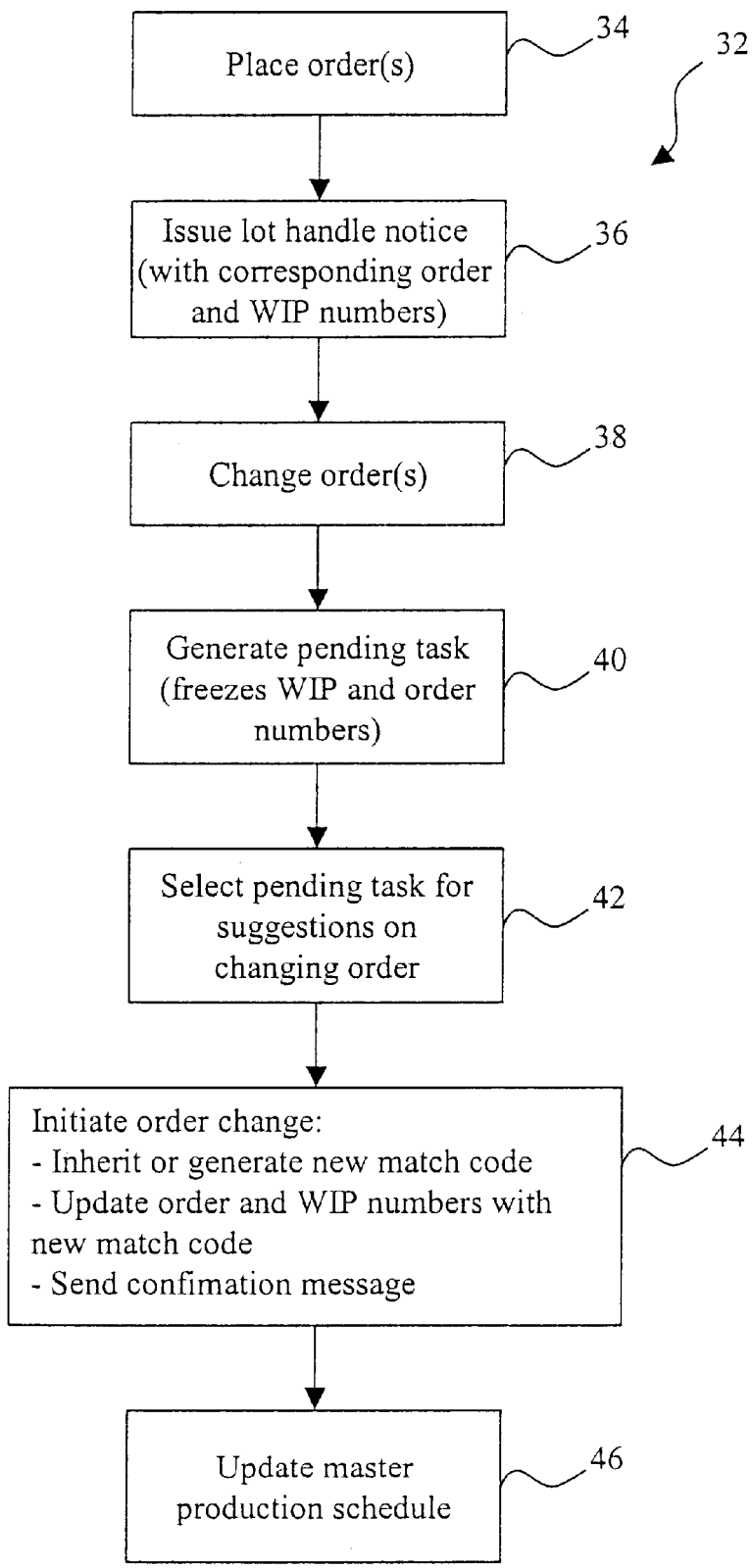
FIG. 3 is a flow chart illustrating one embodiment of an order transaction flow using a synchronized order change process to maintain a relationship between a lot and an order number.

Referring now to FIG. 3, a method 32 illustrates an order transaction flow where a synchronized order change procedure is used to ensure that the order and WIP numbers remain associated with the proper lot even if the order is changed. The method 32 begins in step 34 when a customer places an order. The order is associated with an order number (e.g., 1234A) and a lot handle notice is issued in step 36 and sent to a lot handling system. Associated with the lot handle notice is a WIP number that corresponds to the order number (e.g., 1234A).

In the present example, in step 38, the administrators such as a sales agent may change the order at any time in the manufacturing process (e.g., before or after a release/hold decision, before a pilot lot is released, etc.). When such an order change is detected, the lot handling system generates a "pending task" message and freezes the relationship between the WIP and order numbers in step 40. This ensures that neither of the WIP or order numbers will be changed separately, and so avoids losing track of the relationship between the numbers in the system. Furthermore, the lot handling system may accomplish these tasks in real time by using, for example, an event driven extensible markup language interface and messaging system.

A user (e.g., a customer service representative, a sales representative, or other authorized individual) may then select the pending task and receive suggestions for updating the order in step 42. In step 44, when the order is updated, a number of sub-processes may be invoked. For example, updating the order may involve inheriting or generating a new match code, updating the order and WIP numbers using the match code, and sending a confirmation notice regarding the updated order. In some embodiments, the match code may be automatically updated if a status of the WIP number corresponds to a hold status, a release status, or a new part status. If desired, the synchronized order change process may monitor, alter, or override decisions made by the user if, for example, the user fails to follow the suggestions presented in step 42.

In step 46, a master production schedule (e.g., a production schedule specifying specific items, quantities, and dates at which production is expected to take place) may be updated and confirmed. Accordingly, the order change may be accomplished while synchronizing the order and WIP numbers.

Figure 4:
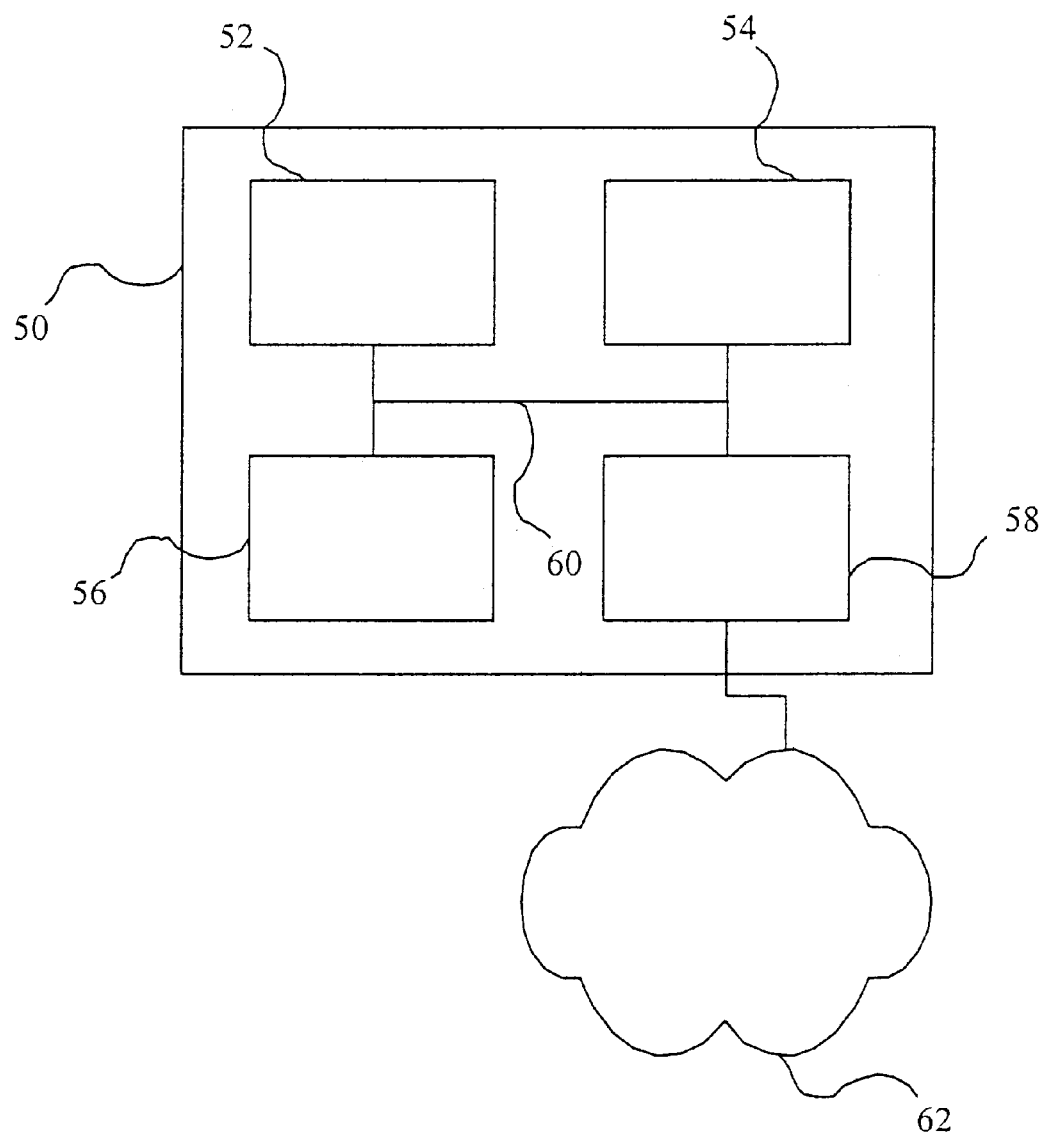
FIG. 4 is an exemplary computer on which various embodiments of the present disclosure may be implemented.

Referring now to FIG. 4, an exemplary computer 50, such as may be used to accomplish the synchronized order change process of FIG. 3, is illustrated. The computer 50 may include a central processing unit ("CPU") 52, a memory unit 54, an input/output ("I/O") device 56, and a network interface 58. The components 52, 54, 56, and 58 are interconnected by a bus system 60. It is understood that the computer may be differently configured and that each of the listed components may actually represent several different components.

The computer 50 may be connected to a network 62 via the network interface 58. For example, the network 62 may connect various portions of a manufacturing facility. Because the computer 50 may be connected to the network 62, certain components may, at times, be shared with other computers (not shown). Accordingly, the method 32 of FIG. 3 may be stored and executed solely on the computer 50 or may be divided among multiple computers and accessible via the network 62. In addition, the network 62 may comprise the bus system 60 and so the various components 52–58 may be distributed through the network 62.

The present invention provides a solution to solve labeling inconsistency problem in a lengthy manufacturing process. It can provide sales force with real time order information, and avoids wasting resources to produces redundant product lots. If necessary, a report can be run on a daily basis (or even an hourly basis) to keep the administrators of the manufacturing process informed continuously. This would help a much more efficient product planning process.

While the preceding description shows and describes one or more embodiments, it will be understood by those skilled in the art that various changes in form and detail may be made therein without departing from the spirit and scope of the present disclosure. Therefore, the claims should be interpreted in a broad manner, consistent with the present disclosure.

What is claimed is:

1. A method for processing at least one order change request in a manufacturing system, wherein the order is associated with an order number and a work in process (WIP) number identifying a physical manufacturing lot, the method comprising:

freezing a relationship between the order number and the WIP number upon receipt of the order change request;

providing at least one order change option based on the order change request;

identifying a match code associated with the order change option; and updating the order number and the WIP number using the match code, so that the WIP number is synchronized with the order number.

2. The method of claim 1 further comprising generating a pending task message to freeze the relationship between the order number and the WIP number.

3. The method of claim 2 further comprising selecting the pending task message to view the order change option.

4. The method of claim 3 further comprising automatically overriding a user entry if the user entry does not correspond to the order change option.

5. The method of claim 1 further comprising sending a confirmation notice to a designated destination to confirm that the order has been successfully changed.

6. The method of claim 1 further comprising:

determining a current status of the order; and freezing the order only if the current status corresponds to a predetermined status.

7. The method of claim 6 wherein the predetermined status is selected from a group consisting of a hold status, a release status, or a new part status.

8. The method of claim 1 further comprising informing a user of the order change request using an event driven notification process.

9. The method of claim 8 wherein the event driven notification process operates in real time.

10. A method for synchronizing an order number and a work in process (WIP) number associated with an order while changing the order, the method comprising:

notifying a user of an order change request using a real time, event driven notification system;

identifying the order associated with the order change request;

providing at least one automated suggestion to the user for changing the order in accordance with the order change request; and executing the order change, wherein executing the order change includes synchronously updating the order and WIP numbers to maintain a relationship between the order and WIP numbers after the change is made.

11. The method of claim 10 further comprising locking the order and WIP numbers upon receipt of the order change request.

12. The method of claim 11 wherein the locking is performed automatically by a handling system.

13. The method of claim 10 further comprising automatically updating a match code if a status of the WIP number corresponds to a predefined value.

14. The method of claim 13 wherein the predefined value is selected from a group consisting of a hold status, a release status, and a new part status.

15. The method of claim 10 further comprising overriding a user command if the user fails to follow the automated suggestion.

16. The method of claim 10 further comprising sending a notification message confirming that the order was successfully changed.

17. A computer system for synchronizing an order number and a work in process (WIP) number when making a change to an order, wherein the order and WIP numbers are associated with the order, the system comprising:

a processor; and a memory accessible to the processor for storing a plurality of instructions for processing by the processor, the instructions for:

receiving an order change request;

generating a pending task message in response to the request;

providing at least one option for changing the order when the pending task is selected; and initiating an order change to synchronously change the order number and the WIP number, wherein a relationship between the order and WIP numbers is maintained during the order change.

18. The computer system of claim 17 further comprising instructions for obtaining a new match code, and updating the order and WIP numbers using the new match code.

19. The computer system of claim 18 further comprising instructions for updating a master production schedule with the updated order and WIP numbers.

20. A method for synchronizing, in a manufacturing process, a first number for identifying an order and a second number associated with the first number for identifying a manufacturing product lot in process, the method comprising:

detecting when the order is changed by a first user in the manufacturing process;

automatically notifying a second user of the order change using a real time, event driven notification system; and executing the order change while maintaining a relationship between the first and second numbers.

21. The method of claim 20 wherein the maintaining further includes indicating the manufacturing lot has pending tasks.

* * * * *